United States Patent [19]

Thomas

[11] Patent Number: 4,782,452
[45] Date of Patent: Nov. 1, 1988

[54] ACOUSTIC DETECTION OF MILLING TOOL TOUCH TO A WORKPIECE

[75] Inventor: Charles E. Thomas, Scotia, N.Y.

[73] Assignee: General Electric Company, Schenectady, N.Y.

[21] Appl. No.: 900,123

[22] Filed: Aug. 25, 1986

[51] Int. Cl.⁴ .................. G08B 21/00; G06F 15/36; G01M 7/00

[52] U.S. Cl. .................. 364/550; 364/508; 73/609; 73/660; 340/680; 340/683

[58] Field of Search ............ 364/550, 551, 517, 508, 364/474; 73/609, 613, 660; 340/680, 683

[56] References Cited

U.S. PATENT DOCUMENTS

| | | | |
|---|---|---|---|
| 3,913,084 | 10/1975 | Bollinger et al. | 340/683 |
| 4,366,544 | 12/1982 | Shima et al. | 340/683 |
| 4,428,055 | 1/1984 | Kelley et al. | 364/374 |
| 4,437,163 | 3/1984 | Kurihara et al. | 364/508 |
| 4,453,407 | 6/1984 | Sato et al. | 364/508 |
| 4,514,797 | 4/1985 | Begin | 364/148 |
| 4,547,771 | 10/1985 | Rockwood et al. | 340/683 |
| 4,554,495 | 11/1985 | Davis | 318/572 |
| 4,558,311 | 12/1985 | Forsgren et al. | 340/680 |
| 4,614,117 | 9/1986 | Taniguti | 340/683 |
| 4,642,618 | 2/1987 | Johnson et al. | 340/683 |

*Primary Examiner*—Parshotam S. Lall
*Assistant Examiner*—David C. Goldman
*Attorney, Agent, or Firm*—Donald R. Campbell; James C. Davis, Jr.; Paul R. Webb, II

[57] ABSTRACT

The initial contact of a rotating milling tool to a workpiece is detected in the presence of spurious noise spikes by digitally processing samples of a preprocessed vibration signal concurrently through basic tool touch detection logic and milling tool touch detection enhancement logic, and generating a touch indication if either logic set is satisfied. The basic logic detects a continuously increasing signal level higher than a threshold set above background noise. The milling logic detects an above-threshold signal sample and sets up an acceptance window about the expected time of contact of the next cutter. Tool touch is declared when an above-threshold signal occurs during the window; the milling logic is reset by a noise spike in the interval before the window starts. The basic logic detects tool touch in a dense spiky noise situation.

12 Claims, 7 Drawing Sheets

BASIC TOOL TOUCH DETECTION LOGIC 15

FIG. 6

FIG. 7
MILLING TOUCH DETECTION, NO SPIKY SPURIOUS NOISE

FIG. 8
MILLING TOUCH DETECTION, OCCASIONAL NOISE SPIKES

FIG. 9
MILLING TOUCH DETECTION IN PRESENCE OF SPIKY NOISE

ACOUSTIC DETECTION OF MILLING TOOL TOUCH TO A WORKPIECE

BACKGROUND OF THE INVENTION

This invention relates to an improved method and system to acoustically detect the initial touch of a milling tool to a workpiece without false touch indications on extraneous machine noises.

The tool touch detection logic of a Machine Tool Monitor disclosed in copending application Ser. No. 749,845, filed June 28, 1985, now U.S. Pat. No. 4,704,693, C.E. Thomas, was developed for lathe applications and has some capability for milling applications. However, the portion of the logic included to avoid false alarms on noise spikes, sometimes found in machine tool operation noise, extracts a larger penalty in milling operations than in lathe operations. This penalty is in the form of delays between the initial touch event and generation of the touch detection signal, and in penetration of the tool into the part before the detection signal is generated. In order to gain the signal information necessary for the pattern recognition logic to discriminate between the touch vibration signal and spurious noise spikes, the preferred embodiment of this standard logic uses a minimum of six signal samples gathered at the rate of one signal sample every half millisecond. The detection can occur in this minimum time only if each signal sample amplitude is above the detection threshold, and also above the amplitude of the immediately preceding sample. Thus, under these ideal conditions the tool is in continuous contact with the workpiece for a period of only three milliseconds before a tool touch detection signal is generated, and the depth of penetration of the tool into the workpiece continuously increases over this period at a rate determined by the tool feedrate. At the usual touch detection feedrate of one inch per minute, the tool penetrates into the workpiece a negligible 0.048 mil in the three milliseconds between initial tool contact and tool touch detection generation.

The situation for milling tool touch detection is quite different. Individual tool inserts around the periphery of a rotating tool do the cutting, and the workpiece may not rotate. Each tool insert contacts the workpiece and penetrates deeper into it along a circular arc, reaching maximum penetration when the radius from the tool center through the insert is perpendicular to the workpiece surface (see FIG. 4), and continuing to follow the circular arc with reducing depth of penetration until the cutter emerges from the workpiece. The resulting vibration signal is a pulse whose duration equals the total time of cutter-workpiece contact. For the very light cuts most compatible with the tool touch detection concept, these pulses are difficult to distinguish from the spiky noise pulses the current standard tool touch detection algorithm is designed to ignore. Analysis shows that this touch detection logic is least satisfactory for milling tool touch detection when the tool speed is high.

Other relevant commonly assigned patents on tool touch detection are U.S. Pat. No. 4,428,055—Kelley et al; No. 4,554,495—Davis; and allowed application Ser. No. 645,203—Thomas, et al., now U.S. Pat. No. 4,704,693, U.S. Pat. No. 4,631,683 is an improvement over the last.

SUMMARY OF THE INVENTION

An object of this invention is to provide an alternative approach to acoustic tool touch detection capable of providing improved performance with milling tools.

Another object is to provide tool touch signature recognition logic that utilizes another technique to avoid false touch indications on spiky noise which works well at high tool speeds.

The method and system for detecting the initial contact of a rotating milling tool and workpiece is as follows. The vibrations of a milling machine are sensed and a vibration signal is generated as the milling tool slowly advances toward the workpiece and makes light rubbing contact. The raw signal is preprocessed in an analog channel to restrict the output to a specific band of frequencies below 100 kHz and prepare the signal for sampling and analog-to-digital conversion. Samples of the analog waveform are digitally processed concurrently through basic tool touch detection logic like that ust discussed and milling tool touch detection enhancement logic, and a tool touch indication is generated when either set of touch recognition logic is satisfied. The milling logic comprises detecting one signal sample whose amplitude is higher than a threshold set above continuous noise peaks, and entering a suspicion mode and setting up an acceptance window about the expected time of contact of the next cutter and workpiece based on knowledge of the tool rotational speed and cutter spacing. A touch indication occurs upon detecting an above-threshold sample in the acceptance window, and the suspicion which may have been triggered by a noise spike is dismissed and the milling logic is reset when no above-threshold sample is detected in the acceptance window.

A feature of the milling tool touch logic is that all signal samples are checked against the threshold, not just those in the acceptance window. A suspicion is dismissed and the logic is reset when a preset number of above-threshold samples are counted in the interval before the acceptance window starts; occasional noise spikes do not trigger a false touch signal. Another feature is that there is preferably a short blank period following detection of the above-threshold sample that caused entry into touch suspicion mode during which above-threshold samples are ignored, whereby the touch event of one cutter is over before checking for touch of the next cutter. The milling logic has a high degree of immunity to noise false alarms, but in dense spiky noise situations most tool touch detections are made with the basic tool touch logic.

The milling tool touch detection system has the vibration sensor, typically a broadband accelerometer, and analog preprocessor described in the copending applications. The milling tool touch detection logic may be used alone in some situations, as on a quiet milling machine.

This touch detection system has utility in the machining process in calibrating milling tool position and using the tool directly for part gauging on rough cuts and sometimes on finish cuts. It is compatible with the tool break detection systems described in published technical papers and other copending applications.

DETAILED DESCRIPTION OF THE INVENTION

Figure 1:
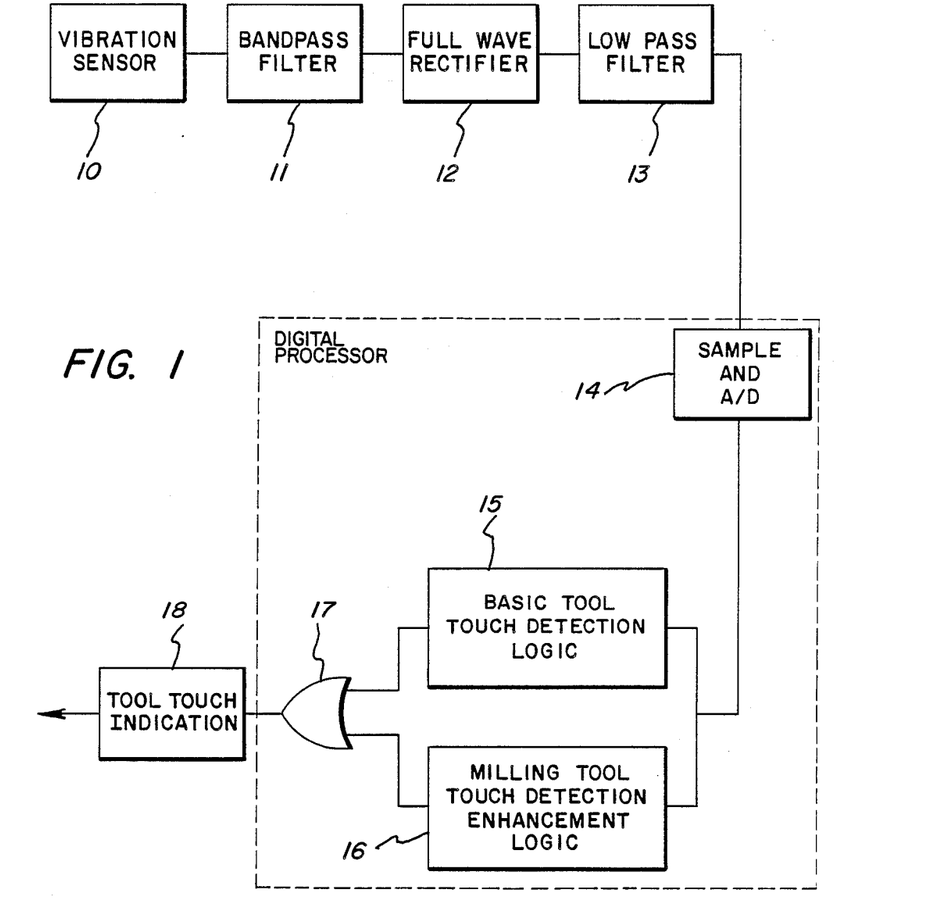
FIG. 1 is a block diagram of the milling tool touch detection system.

Referring to the complete milling tool touch detectron system in FIG. 1, a vibration sensor 10 such as a broadband accelerometer is mounted on the milling machine or workpiece in a location with good coupling to vibrations caused by tool-workpiece contact. The sensor output is restricted by a bandpass filter 11; lower frequency machinery noise below about 30 kHz is filtered out and frequencies above 100 kHz are ignored because they are more attenuated and distorted by propagating to a remotely mounted sensor. A signal energy detector is provided comprised of a full wave rectifier 12 and low pass anti-aliasing filter 13. At the output of the analog signal processing channel is a unipolar analog waveform representative of the amplitude of vibrations in the chosen frequency band. The first part of the digital processor is an analog-to-digital converter 14 which samples the analog waveform at, say, 2 kHz. The amplitude of the samples is then analyzed by the digital processor in real time. Signal samples are routed to the basic tool touch detection logic 15 and to the milling tool touch detection enhancement logic 16 which operate concurrently and in parallel. Either logic set can produce a touch detected signal which is gated by OR circuit 17 and results in a tool touch indication or output signal 18 that is sent to the machine tool control to stop the advance of the tool and retract it out of the cut.

Figure 2:
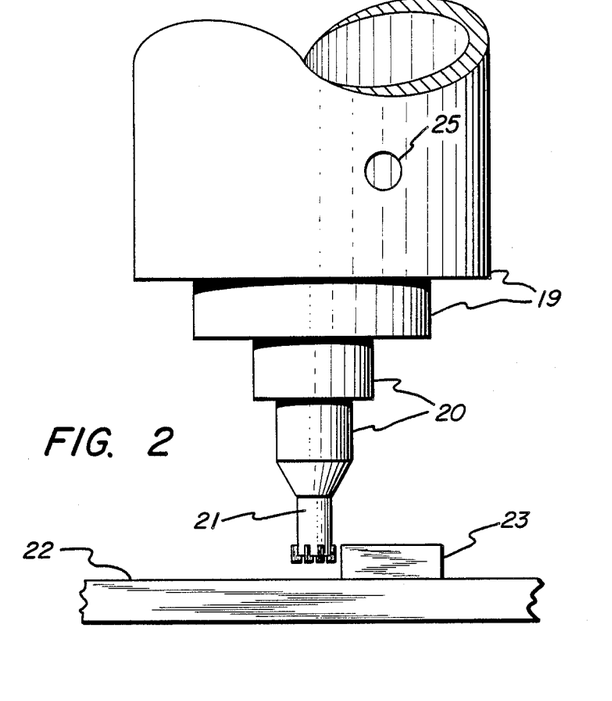
FIG. 2 is a simplified side view of part of a milling machine showing the vibration sensor.
Figure 3:
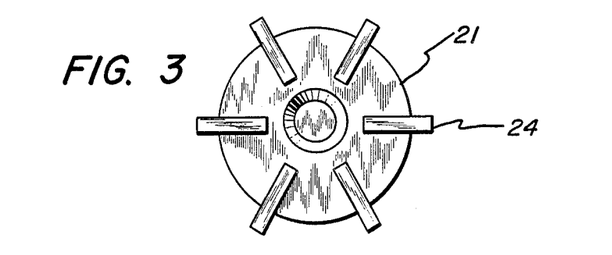
FIG. 3 is an end view of a milling tool.

A typical milling machine is illustrated in FIG. 2 which shows the spinde housing 19, tool holder 20, milling tool 21, fixed bed 22, and the workpiece 23. This milling tool 21 is seen in FIG. 3 to have six equally spaced cutters 24. Milling tools have one to twelve and more such equally spaced cutters or cutting inserts. One satisfactory mounting location for accelerometer 25 is on spindle housing 19, a stationary part of the machine tool.

Figure 4:
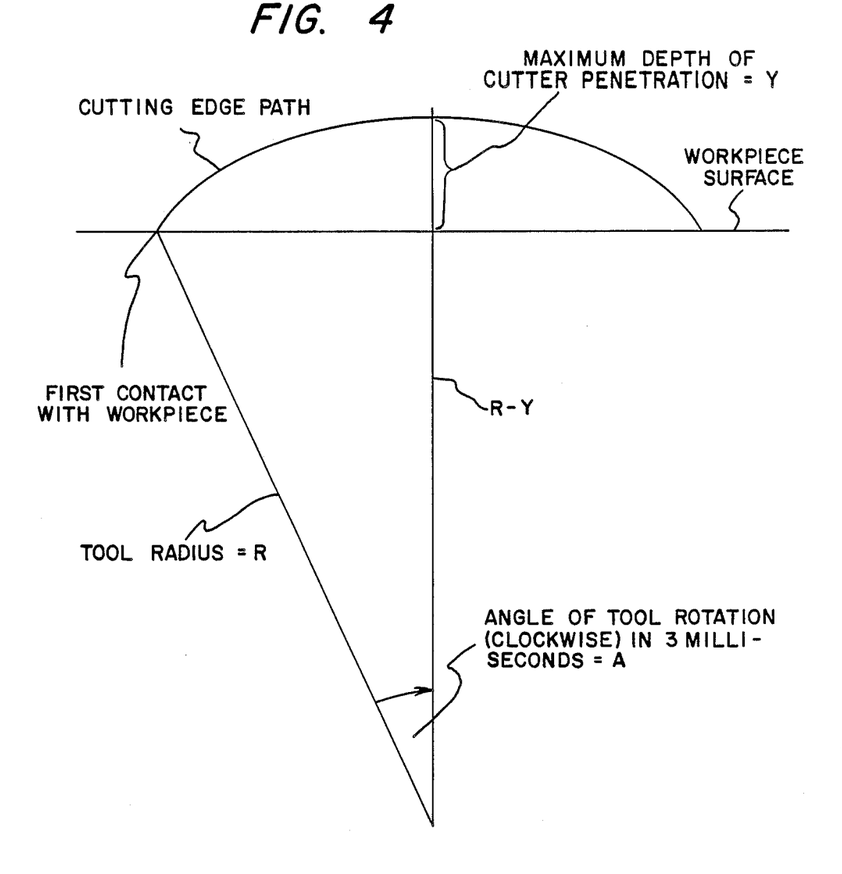
FIG. 4 shows the assumed milling touch geometry.

Basic tool touch detection logic 15 as currently implemented requires at least three milliseconds of continuously increasing vibration signal level to generate a tool touch indication. The performance of the basic touch logic deteriorates rapidly as tool speed increases, and it is seen in FIG. 4 that the signal level increases only between the time of initial cutter touch to the time when the radial line from the tool center through the cutter becomes perpendicular to the workpiece surface The reason for the three milliseconds positive slope requirement is to prevent false alarms or indications on spiky noise that provides impulse excitation of the analog signal channel. Such spiky noise comes out of the analog channel with a characteristic shape in which the initial positive slope duration is about 1.5 to 2 milliseconds, thus failing to satisfy the tool touch detection requirements.

Figure 5:
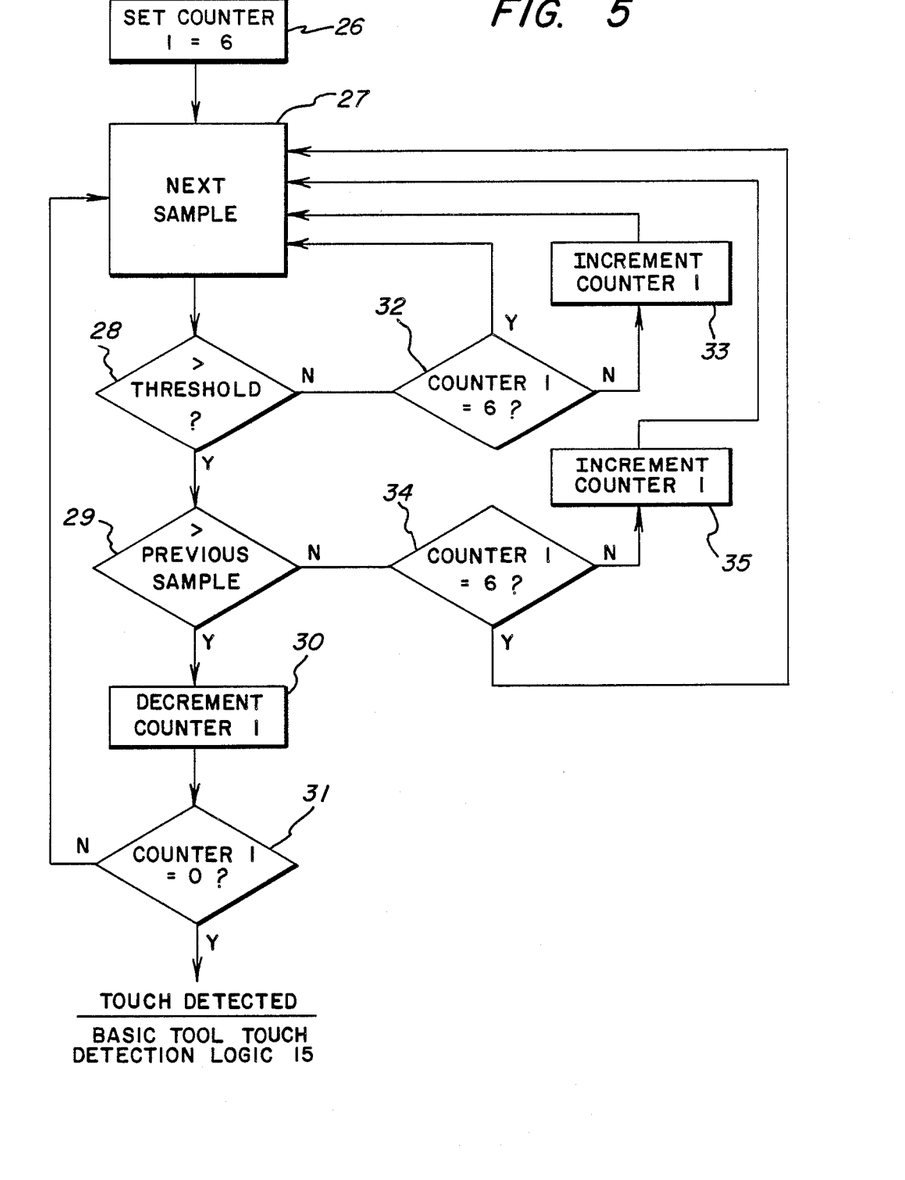
FIGS. 5 and 6 are flow charts of the basic tool touch detection logic and supplemental logic for milling applications.

The flow chart in FIG. 5 illustrates basic tool touch logic 15 in greater detail. In this example it is assumed that signal samples are acquired at a rate of one sample every half millisecond. The first step 26 is that up/down counter 1 is preset to 6. At steps 27-31, the amplitude of the next sample is checked against a threshold amplitude set above continuous background noise peaks and, if above threshold, the second test is whether the sample amplitude is also above the amplitude of the immediately preceding sample. Counter 1 is decremented if both tests are passed and the counter is not at 0. According to steps 32 and 33, below-threshold samples cause counter 1 to increment and count back up provided it is not at 6. The next sample is now processed. At steps 34 and 35, negative slope above-threshold samples cause the counter to increment unless the counter is already set at 6, and the next sample is taken. To generate a touch detected signal, six positive slope above-threshold samples are required in excess of the sum of below-threshold samples and negative slope above-threshold samples. A tool touch indication is produced in minimum time (three milliseconds) by six consecutive positive slope above-threshold samples. As milling tool speed increases the performance of the basic touch logic 15 is less and less satisfactory.

The invention provides an alternative tool touch signature recognition logic that uses a different technique to avoid false touch signals on spiky noise, and works best for high tool speeds. A typical milling tool has several cutters in fixed positions around its periphery and cuts with a nearly constant rotational speed. Therefore, once the first cutter contacts the workpiece, the timing of the next cutter's first contact is predictable unless it is offset so that it makes no contact on that tool revolution. Any spike of signal occurring at a time between expected cutter contacts can safely be rejected as spurious noise, once the first contact has been identified. Therefore, a tool touch detection scheme can be based upon logic which detects a signal sample above a threshold amplitude and then looks for one or more subsequent high signal samples in time windows spaced to search the regions where additional cutter contacts are expected. The problem with this basic approach is that what the logic thinks is the initial cutter contact may itself be a spurious noise spike, in which case the subsequent cutter contacts would occur outside the search windows and would be ignored. Consequently, the tool touch recognition logic has to make use of information received between the time of the first above-threshold signal sample and the window in the expected next cutter contact period.

Figure 6:
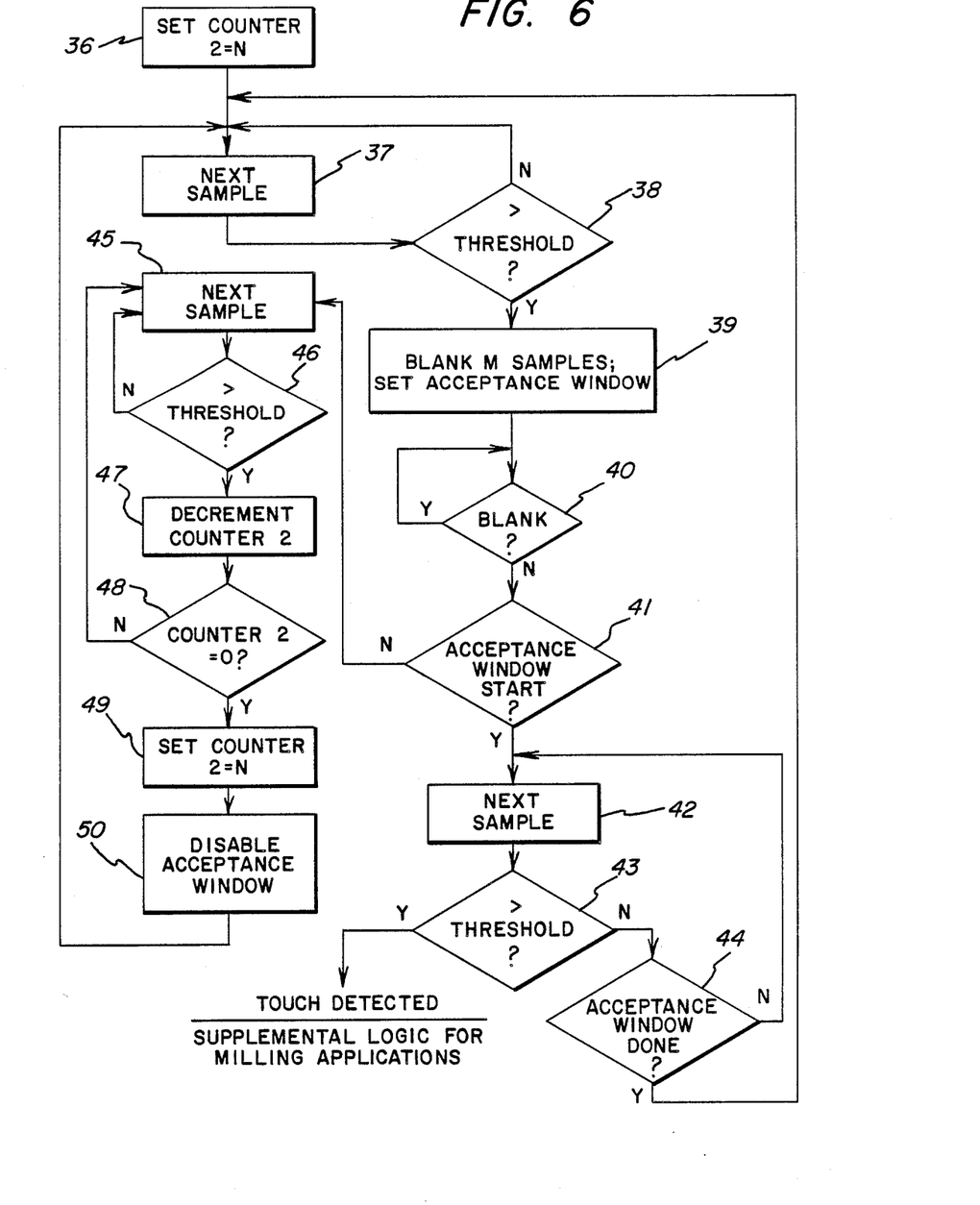

FIG. 6 is a flow chart of milling tool touch detection enhancement logic 16, and features of this supplemental logic for milling applications are reviewed. First, it detects any signal sample above the threshold set above continuous background noise peaks. Second, the logic goes into a touch suspicion mode when an above-threshold sample is detected Third, the milling touch logic sets up an acceptance window of time about the expected time of contact of the next cutter with the workpiece, based on knowledge of tool rotational speed and spacing of cutters around the tool periphery. Fourth, it checks all signal samples against the threshold, not just those in the acceptance window. Fifth, the supplemental logic generates a tool touch signal upon detecting no high signal samples between the end of a short blank period following the sample that caused the entry into touch suspicion mode and the start of the acceptance window, but a high signal sample is detected in the acceptance window. During the blank period, which is long enough that the initial touch event of the first cutter to touch the workpiece is over, any above-threshold samples are ignored. Sixth, when no above-threshold signal sample is detected by the milling touch logic in the acceptance window, the touch suspicion is dismissed and the logic is reset to look for the next above-threshold signal sample, on which a new suspicion will be generated and checked out. Seventh, when more than a preset number, N, of above-threshold signal samples are detected in the interval between the touch suspicion and the acceptance window, the suspicion is dismissed and the logic is immediately reset to look for new suspicions. Eighth, the milling tool touch logic 16 is operated in parallel with the basic tool touch logic 15 on an OR function basis, so that a tool touch detection occurs when either set of tool touch recognition logic is satisfied. The milling logic has a high degree of immunity to noise false alarms, but dense noise spikes can prevent it from detecting the tool touch vibration signal. In a dense noise situation the complete system will tend to make most tool touch detections with the basic touch logic channel In FIG. 6, the first step of the supplemental logic for milling applications is to set up/down counter 2 to N samples, where N is typically 2 or 3, enough to indicate the probable occurrence of a noise spike. Steps 37 and 38 are that the next sample is processed and checked against the threshold. If lower, the next sample is examined, and if above the threshold (step 39) a short blank period of M samples is set up and an acceptance time window about the expected time of occurrence of the next cutter touch. The reason for the blank period was explained but alternatively it may be eliminated and N increased. During the blank period (step 40) above-threshold samples that are detected are ignored, and after it has ended a check is made at step 41 to determine if the acceptance window has started. If yes, steps 42-44 are that the next sample is accepted and checked against the threshold. When above the threshold, a touch detected signal is generated; if below the threshold it is determined whether the acceptance window is done. During the acceptance window time steps 42-44 are repeated; after the end of the acceptance window the logic is recycled back to the start at step 37. No milling tool touch has occurred, and the logic is reset to look for the next suspicion at step 38.

When an above-threshold sample is detected in the interval between the end of the blank period and start of the acceptance window, the logic branches at step 41 to steps 45-50. The next sample is accepted and tested against the threshold and this repeats until an above-threshold sample is found. At this point counter 2 is decremented and the counter is checked to see if it is at 0; if not, steps 45-48 are repeated. When counter 2 is 0, the suspicion is dismissed and, at steps 49 and 50, counter 2 is reset to N and the acceptance window is disabled. The milling tool touch detection enhancement logic is recycled through steps 37-41 and so on.

Figure 7:
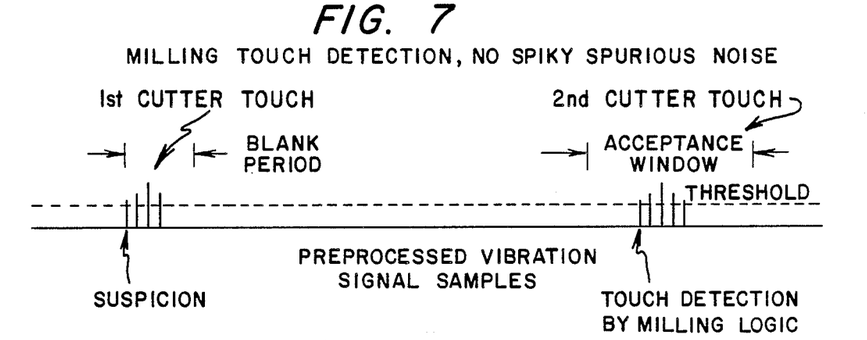
FIGS. 7-9 illustrate operation of the logic and milling touch detection with no spiky spurious noise, in the presence of occasional noise spikes, and in the presence of dense spiky noise.
Figure 8:
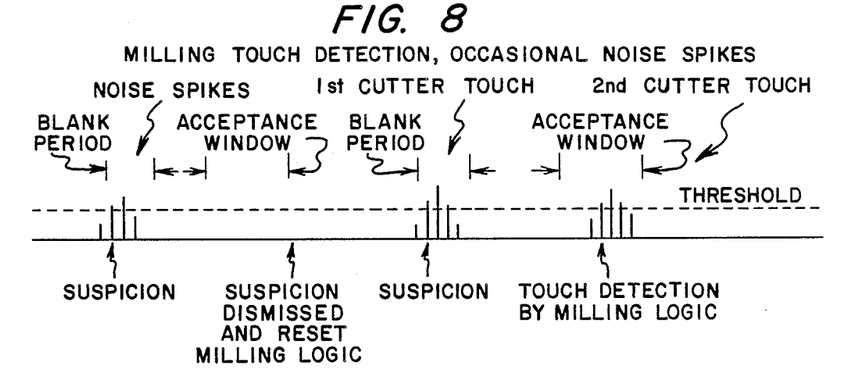
Figure 9:
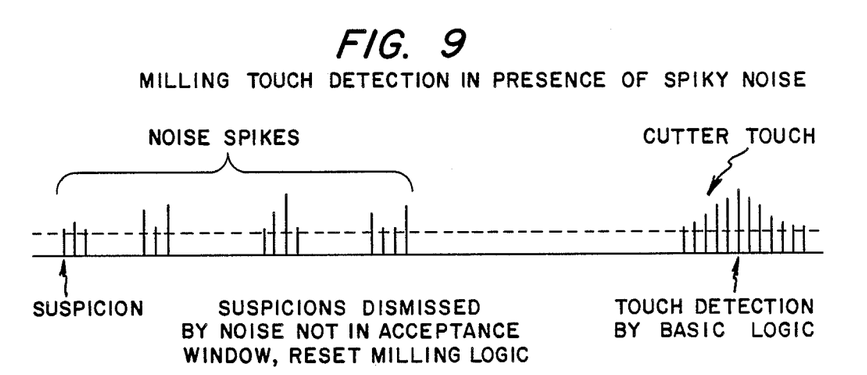

FIGS. 7-9 show operation of the complete milling tool touch detection logic, basic logic 15 plus milling logic 16, with no spiky noise present, occasional noise spikes, and in the presence of dense spiky noise. In FIG. 7, the suspicion mode is entered upon detecting the first above-threshold sample during the first cutter touch, and a blank period longer than the anticipated touch duration is set up during which above-threshold samples are ignored. The acceptance window about the expected time of the second cutter touch is also set up. There is no spiky noise and no samples higher than the threshold are detected between the blank period and acceptance window. Detection of the first above-threshold sample as the second cutter makes light rubbing contact with the workpiece results in the tool touch indication 18.

FIG. 8 shows that the milling touch logic 16 is effective to reject a noise spike and signal a valid milling tool touch promptly before significant marring of the workpiece occurs. For this situation the milling touch logic 16 is much better than the basic touch logic 15 and results in less part marring at most tool speeds. Even in a worst case scenario where a noise spike triggers the milling logic and opens a window beyond the first tool cutter touch spike, the detection delay will only double the part penetration plotted on FIG. 10, which assumes that the first tool cutter touch spike opens a window and the second one triggers a touch indication. For the situations depicted in FIGS. 7 and 8, the milling tool logic 16 alone is sufficient.

In FIG. 8, detection of the first above-threshold signal sample at the start of a noise spike causes entry into a touch suspicion mode and the setting up of a short blank period and an acceptance window. No sample above the threshold is found in the acceptance window; consequently the touch suspicion is dismissed and the milling logic is reset per step 44 in FIG. 6. At the next tool cutter touch spike, the logic again enters the touch suspicion mode, sets up a blank period during which above-threshold samples are ignored, and sets up an acceptance window. The detection of one above-threshold sample in the acceptance window results in generation of a tool touch indication by the milling logic.

In a dense spiky noise situation the user should try to find and fix the noise source. If this cannot be done, both the basic logic 15 and milling logic 16 are used and either may generate a tool touch signal first. FIG. 9 depicts a situation where touch detection is by the basic logic. The first noise spike has an above-threshold sample which sets up the touch suspicion. The logic establishes a blind period and acceptance window, but the suspicion is dismissed by noise not in the acceptance window and the milling logic is reset and recycled. Another suspicion is triggered by the next noise spike but it too is dismissed, and so on. When a light cutter touch occurs, not sufficiently deep to meet the requirements of the basic logic, it may be dismissed by a noise spike occurring before the start of the acceptance window. The noise spike triggers may be so frequent that the system spends most of its time in the blank period between trigger spikes and acceptance windows, increasing the probability of missing cutter contact noise that occurs during a blank period. A deeper cutter touch, which produces six positive slope signal samples above the threshold, results in tool detection by the basic logic 15 and a tool touch indication is output to the machine tool controller.

Figure 10:
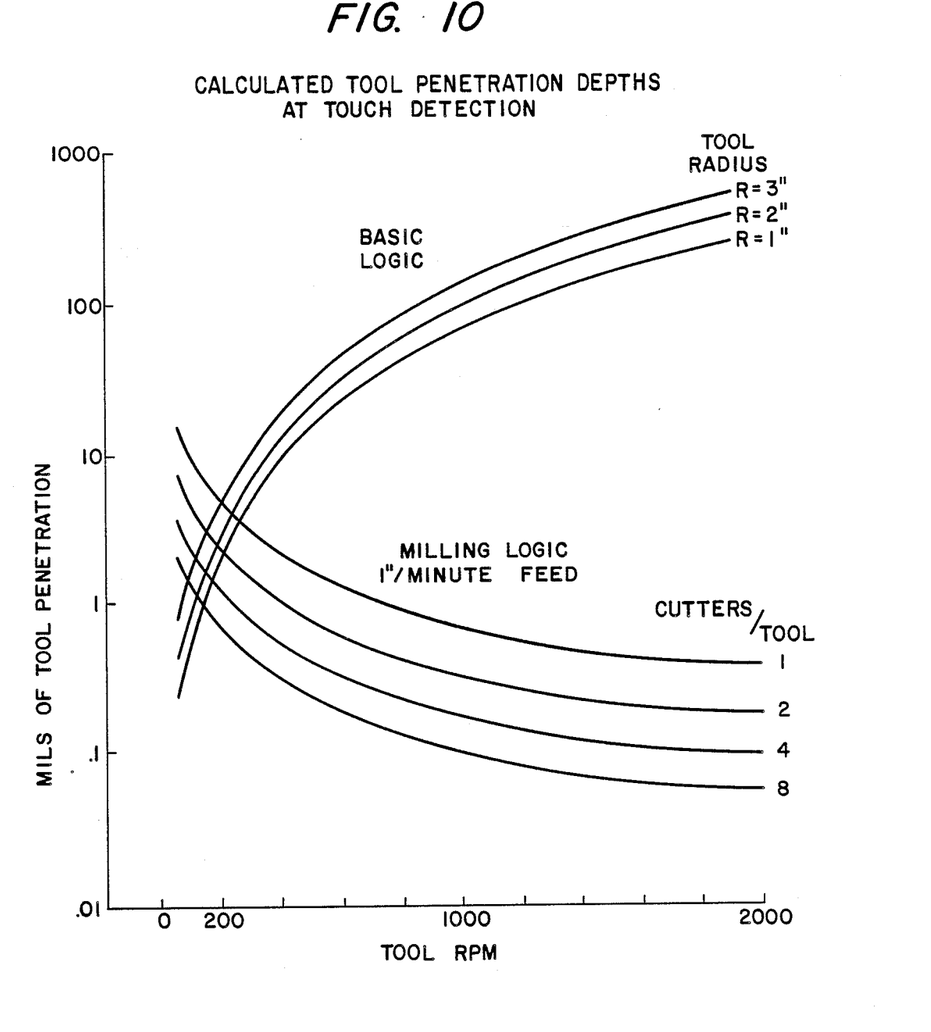
FIG. 10 shows plots with semi-log scales of calculated maximum milling tool penetration depths at tool touch detection for the basic tool touch logic and the milling tool enhancement logic.

FIG. 10 shows plots of calculated maximum milling tool penetration depths at the time of tool touch detection logic satisfaction for both the basic tool touch detection logic 15 and the new milling tool touch detection enhancement logic 16. Basic touch detection logic performance is shown versus tool RPM for three tool radii. The performance of the milling tool touch detection enhancement logic is shown versus tool RPM for four different numbers of cutters on the tool. The milling logic described herein has a great advantage at most tool speeds. At very low tool speeds (below 100 RPM), where an advantage is shown for the basic logic, some system installations may not receive adequate tool touch vibration signal levels, and the indicated advantage of the basic logic may disappear.

The major uses of milling tool touch information in a machining process have been given and reference may be made to U.S. Pat. No. 4,554,495. Another is to find the approximate loation of a rough part surface before the first cut to that the part program won't cause the tool path to generate wasted "air cuts" due to uncertainty as to where the part surface is. The sensor, analog signal channel, and the problem of rejecting noise spikes as false touch indications are further explained in U.S. Pat. No. 4,631,683, the disclosure of which is incorporated herein by reference.

While the invention has been particularly shown and described with reference to preferred embodiments thereof, it will be understood by those skilled in the art that various changes in form and details may be made without departing from the spirit and scope of the invention.

The invention claimed is:

1. A method of acoustically detecting the initial contact of a workpiece and rotating milling tool having one or more cutters comprising:
    sensing vibrations and generating a vibration signal as said milling tool slowly toward said workpiece and makes light rubbing contact;
    preprocessing said signal in an analog channel to restrict the output waveform to a specific band of frequencies and prepare the signal for sampling and analog-to-digital conversion;
    digitally processing signal samples of said analog output waveform concurrently through basic tool touch detection logic and milling tool touch detection enhancement logic, and generating a tool touch indication when either set of detection logic is satisfied;
    said basic tool touch logic comprising checking each sample amplitude against a threshold set above continuous background noise peaks, and generating said tool touch indication upon detecting a predetermined number of positive slope above-threshold signal samples;
    said milling tool touch logic comprising entering into a touch suspicion mode upon detecting one above-threshold signal sample and setting up an acceptance time window about the expected time of contact of the next cutter and said workpiece, and generating said tool touch indication upon detecting an above-threshold signal sample in said acceptance window.

2. The method of claim 1 further comprising dismissing said touch suspicion upon counting a preset number of above-threshold signal samples in the interval before start of said acceptance window.

3. The method of claim 1 further comprising providing a blank period after detection of the above-threshold sample that caused entry into said touch suspicion mode, and dismissing said touch suspicion upon counting a preset number of above-threshold signal samples in the interval between the end of said blank period and start of said acceptance window.

4. The method of claim 1 wherein all signal samples after entry into said touch suspicion mode are checked against said threshold.

5. The method of claim 4 wherein said basic and milling touch logic both reject, as false alarms, spurious noise spikes whose amplitude is higher than said threshold and which, in the last-mentioned logic, occur outside of said acceptance window.

6. A method of acoustically detecting an initial contact between a workpiece and a rotating milling tool having one or more cutters comprising:
    sensing milling machine vibrations as said milling tool slowly advances toward said workpiece and makes light rubbing contact, and generating a vibration signal;
    preprocessing said signal to filter out lower frequency machinery noise and detect the signal energy, and produce a unipolar analog waveform representative of the amplitude of vibrations in a frequency band below 100 kHz;
    sampling said analog waveform and converting samples to digital values; and
    digitally processing said samples concurrently through basic tool touch detection logic and milling tool touch detection enhancement logic, either of which generates a tool touch indication;
    said basic touch tool logic comprising checking each sample amplitude against a threshold set above continuous background noise peaks, and generating said tool touch indication upon detecting a preset number of positive slope above-threshold samples in excess of below-threshold samples and negative slope above-threshold samples;
    said milling tool touch logic comprising entering a touch suspicion mode upon detecting an above-threshold sample and setting up an acceptance time window about the expected time of contact of the next cutter and workpiece, dismissing said touch suspicion and resetting said milling tool touch logic when a preset number of above-threshold samples are detected in the interval before start of said acceptance window or when no above-threshold sample is detected in said acceptance window, and generating said tool touch indication upon detection of one above-threshold sample in said acceptance window.

7. The method of claim 6 wherein said milling tool touch logic further comprises setting up a short blank period following detection of the sample that caused entry into said touch suspicion mode during which above-threshold samples are ignored.

8. A system to detect the initial touch to a workpiece of a rotating milling tool having one or more cutters comprising:
    a vibration sensor to be mounted on a milling machine with good coupling to sense vibrations caused by light rubbing contact of said tool and workpiece and generate a signal;
    an analog preprocessor which filters and prepares the vibration signal for digital analysis and has a unipolar output signal in a chosen band of frequencies;
    a digital processor having means to sample the analog output and convert samples to digital format; and
    milling tool touch detection logic having good immunity to spurious noise spikes and comprised of first means to detect signal samples whose amplitude exceeds a threshold set above continuous background noise peaks, second means to enter a touch suspicion mode upon detecting an above-threshold sample and to set up an acceptance window about the expected time of contact of the next cutter and workpiece, third means to dismiss the touch suspicion and reset the logic when a preset number of above-threshold samples are detected in the interval before said acceptance window starts, and fourth means to generate a tool touch signal upon detecting an above-threshold sample in said acceptance window and to dismiss the touch suspicion and reset the logic if no above-threshold sample is detected in said acceptance window.

9. The system of claim 8 wherein said second means further comprises means to set up a short blank period following detection of the above-threshold sample that caused entry into said touch suspicion mode, during which any above-threshold samples are ignored, said blank period being long enough that an initial cutter touch event triggering said touch suspicion is over.

10. The system of claim 9 wherein said third means comprises a counter and said preset number of above-threshold samples counted thereby is sufficient to dismiss a spurious noise spike occurring between the end of said blank period and start of said acceptance window.

11. The system of claim 8 including basic tool touch detection logic operated in parallel with the first-mentioned milling tool touch logic either of which can generate said tool touch signal, said basic logic comprised of means to generate said tool touch signal upon detecting a preset number of positive slope above-threshold samples in excess of below-threshold samples plus negative slope above-threshold samples, where said preset number is sufficient to avoid false touch signals on spurious noise spikes.

12. The system of claim 8 wherein said vibrations sensor is an accelerometer and said chosen band of frequencies is between 30 kHz and 100 kHz.

* * * * *